3,025,275
COPOLYMERS
Richard F. Heck, Wilmington, Del., assignor to Hercules Powder Company, Wilmington, Del., a corporation of Delaware
No Drawing. Filed Mar. 2, 1960, Ser. No. 12,275
6 Claims. (Cl. 260—80.3)

The present invention relates to novel copolymers. More specifically, the invention relates to copolymers of vinyl 2-chloroethyl ether with a vinyl ether of a monoethylenically unsaturated alkanol or a 1-alkoxybutadiene.

It is well known that vinyl allyl ether, vinyl 2-chloroethyl ether and 1-alkoxybutadienes can be polymerized to yield their respective homopolymers. It is also known that vinyl allyl ether can be copolymerized with a vinyl alkyl ether using an acid aluminum sulfate or a Friedel-Crafts type catalyst to yield copolymers that vary from oils to resinous masses.

It has now been found that vinyl 2-chloroethyl ether can be copolymerized with either a vinyl ether of a monoethylenically unsaturated alkanol or a 1-alkoxybutadiene to produce new and useful high molecular weight, solid thermoplastic copolymers which can be easily fabricated into a variety of shapes and which are characterized by high resistance to organic solvents.

Accordingly, the present invention relates to a solid copolymer of vinyl 2-chloroethyl ether and at least one other ether selected from the group consisting of vinyl ethers of monoethylenically unsaturated alkanols and 1-alkoxybutadienes.

Before describing the invention in greater detail, the following examples are illustrative of the preparation of the new copolymers, parts and percentages being by weight unless otherwise specified. The molecular weight of the copolymers in the examples is indicated by the reduced specific viscosity given therein. By the term "reduced specific viscosity" (RSV) is meant the specific viscosity, divided by the concentration of the solution in grams per 100 ml., measured at 25° C., on a solution in chloroform containing 0.1 gram of the copolymer in 100 ml. of the solution.

*Example 1*

The catalyst used in this and the following examples was prepared by mixing under nitrogen 7.9 parts of aluminum isopropoxide in heptane with 0.88 part of 100% sulfuric acid. The resulting slurry was shaken for 2 hours with glass beads and then allowed to stand at room temperature for 24 hours after which it was stored at −5° C. until used.

A polymerization vessel with a nitrogen atmosphere was charged with 33 parts of dry methylene chloride, 9 parts of vinyl 2-chloroethyl ether, 0.8 part of vinyl allyl ether and 0.17 part of aluminum isopropoxide as a 0.8 M solution in heptane. The solution was stirred magnetically while cooling to 0° C., and then 0.2 part of catalyst, based on aluminum isopropoxide added, was added in three portions 1 hour apart. The reaction mixture was agitated at 0° C. for 2 hours and then at room temperature overnight, after which the copolymerization was stopped by adding 4.5 parts of a 1.0 M solution of ammonia in ethanol. There was then added 4.5 parts of a 1.0% solution of 4,4'-thiobis(6-tert-butyl-m-cresol) in ethanol as a stabilizer for the copolymer, and the reaction solution was evaporated to dryness under vacuum. The crude copolymer which remained as a residue was extracted with methanol. The methanol-insoluble copolymer amounted to 5.23 parts and had an RSV of 1.06. An infrared analysis showed that the copolymer contained 5 mole percent of vinyl allyl ether.

A sample of the above copolymer was cross-linked by milling together 100 parts of the above copolymer, 25 parts of high abrasion furnace black, 2.5 parts of tetramethylthiuram disulfide, 5 parts of sulfur, 5 parts of zinc oxide, and 2 parts of stearic acid and then curing for 40 minutes at 154° C. The percent gel of the vulcanizate was 99 and the percent swell 110.

The percent gel is indicative of the percentage of copolymer that is cross-linked, and the percent swell is inversely proportional to the tightness of cross-linking. The percent gel and percent swell are determined as follows: a weighted cylindrical sample of copolymer weighing about 100 mg. is soaked in an excess of toluene (30 cc.) in a closed container for 48 hours. The sample is then removed, blotted on filter paper without squeezing, so as to remove toluene on the surface, and weighed at once. The swollen sample is then dried in a current of air at room temperature over a 72-hour period to constant weight. The weights of initial and final sample are corrected for nonpolymer content based on knowledge of components. From these figures:

$$\frac{\text{corrected dry weight}}{\text{corrected initial weight}} \times 100 = \text{percent gel}$$

Similarly, percent swell is calculated by the formula:

$$\frac{\text{corrected swollen weight} - \text{corrected dry weight}}{\text{corrected dry weight}}$$

$$\times 100 = \text{percent swell}$$

*Example 2*

A polymerization vessel with a nitrogen atmosphere was charged with 66 parts of dry methylene chloride, 0.14 part aluminum isopropoxide, as a 0.72 M solution in heptane, 16 parts of vinyl 2-chloroethyl ether and 4.8 parts of vinyl allyl ether. The solution was stirred magnetically while cooling to 0° C. and then 0.85 part of the catalyst was added incrementally, 12 increments of 0.017 part each, followed by 9 increments of 0.034 part each, being added at 5-minute intervals. After stirring at 0° C. for 4 hours, another 10 increments of 0.034 part catalyst were added at 5-minute intervals. The reaction mixture was agitated at 0° C. for 1 hour and then at room temperature overnight. The copolymerization was stopped by adding 1.6 parts of a 1.0 M solution of ammonia in ethanol and 1.6 parts of a 1.0 percent solution of 4,4'-thiobis(6-tert-butyl-m-cresol) in ethanol was added as a stabilizer. The solution was evaporated to dryness under vacuum, and the crude copolymer obtained was comminuted with methanol and washed with methanol 3 times. There was obtained 10.8 parts of a slightly tacky, methanol insoluble copolymer having an RSV of 2.0. Infrared analysis showed that the copolymer contained 15 mole percent vinyl allyl ether.

A sample of the above copolymer was cross-linked by milling a mixture of 100 parts of the above copolymer, 25 parts of high abrasion furnace black, 1.5 parts of 2-mercaptobenzothiazole, 2 parts of sulfur, 3 parts of zinc oxide and 2 parts of stearic acid and then curing for 40 minutes at 154° C. The vulcanizate had a tensile strength of 1,320 p.s.i., a modulus at 300% elongation of 1,190 p.s.i., and a maximum elongation of 310%.

*Example 3*

A polymerization vessel with a nitrogen atmosphere was charged with 13.2 parts of dry methylene chloride, 0.17 part aluminum isopropoxide, as a 0.85 M solution in heptane, 9 parts of vinyl 2-chloroethyl ether and 0.8 part of 1-methoxybutadiene. After cooling to 0° C. with magnetic stirring, 0.1 part of catalyst was added in two equal portions 1 hour apart. The copolymer was isolated and extracted with methanol as in Example 1 and 1.38 parts of a solid, methanol-insoluble copolymer having an RSV of 0.64 was obtained.

Vinyl 2-chloroethyl ether can be copolymerized with either a vinyl ether of a monoethylenically unsaturated alkanol or a 1-alkoxybutadiene in any desired ratio. Exemplary of the 1-alkoxybutadienes that can be so copolymerized are 1-methoxybutadiene, 1-ethoxybutadiene, 1-propoxybutadiene, 1-isopropoxybutadiene, 1-n-butoxybutadiene, 1-(2-methoxy-ethoxy)butadiene, etc. Exemplary of the vinyl ethers of monoethylenically unsaturated alkanols are vinyl allyl ether, vinyl methallyl ether, butenyl vinyl ether, 4-pentenyl vinyl ether, etc.

As pointed out above, a copolymer of any desired ratio of monomers can be produced by varying their ratio in the copolymerization reaction. Thus, copolymers can be produced containing from about 1% to about 99% vinyl 2-chloroethyl ether but those that contain at least 75% vinyl 2-chloroethyl ether are preferred as possessing optimum solvent resistance. Copolymers of various molecular weights can also be produced, however those copolymers having an RSV of at least 0.5 are the most useful.

The preparation of these new copolymers is readily carried out by contacting the monomers with a suitable catalyst. Preferred catalysts are the reaction products of an aluminum trialkyl, an aluminum trialkoxide or an aluminum alkyl alkoxide with sulfuric acid. Another class of catalysts that is effective for the production of these copolymers includes the reaction products of a metallic sulfate and a metal alkyl or metal alkoxide. Exemplary of the foregoing classes of catalysts are the reaction products of triethylaluminum, triisobutylaluminum, trihexylaluminum, aluminum diethyl ethoxide, etc., with sulfuric acid, the reaction products of aluminum isopropoxide, aluminum isobutoxide, etc., with sulfuric acid and the reaction products of aluminum sulfate with aluminum isopropoxide, titanium isopropoxide, etc.

The copolymerization is generally, for convenience of handling, carried out in an inert, liquid, organic diluent. Suitable diluents that can be used are: aliphatic, cycloaliphatic and aromatic hydrocarbons such as hexane, heptane, cyclohexane, benzene, toluene, xylene, etc., halogenated hydrocarbons such as methylene chloride, chloroform, carbon tetrachloride, chlorobenzene, etc., ethers such as diethyl ether, diisopropyl ether, etc., esters such as ethyl acetate, etc. In general, the reaction is carried out at a temperature of from about −50° C. to about 100° C.

When the copolymerization is carried out as described above, the copolymer is readily isolated from the solution or slurry of copolymer and diluent by simply removing the diluent by evaporation or other such means. Frequently, it is desirable to add a stabilizer as the diluent is removed at an elevated temperature. The crude copolymer can be extracted with methanol to remove any low molecular weight polymer that may be present and a portion of the catalyst residues. Remaining catalyst residues can be removed by washing with hot alkali, if desired.

For many applications, it may be desirable to incorporate antioxidants, pigments, fillers, plasticizers, etc., in these copolymers before fabrication.

The copolymers of this invention can be predominantly crystalline or totally or predominantly amorphous or they can be a mixture of crystalline and amorphous copolymers, depending on the ratio of the monomers present therein and on the polymerization conditions. Both forms possess a variety of uses. The totally or predominantly amorphous copolymers when cross-linked can be used, for instance, as specialty rubbers where their resistance to organic solvents makes them valuable in preparing gaskets, hoses, seals, packings, rings, etc. Relatively crystalline copolymers can be injection molded, extruded or compression molded and can, for instance, be used in the form of oriented film for protective wrappings and as oriented fiber in tire cord, textile fibers, in resin reinforcement, in nonwoven fabrics, in rope, etc. Other uses will, of course, suggest themselves to the person skilled in the art.

In the uses of the copolymers, improved durability and solvent resistance properties are achieved by treating with an appropriate cross-linking agent. Examples of appropriate cross-linking agents are: polyamines, such as ethylene diamine, and N-(hydroxethyl) diethylene triamine; combinations of an amine or sulfur and a thiuram sulfide, dithiocarbamate or thiazole, e.g., rosin amine—tetramethyl thiuram disulfide, tributylamine—2-mercaptobenzothiazole, rosin amine—zinc dimethyldithiocarbamate, sulfur—tetramethylthiuram disulfide, sulfur—2-mercaptobenzothiazole, etc. These copolymers are also capable of being cross-linked by sulfur alone due to the active double bonds remaining in the copolymer. However, best results are obtained when the sulfur is combined with one of the above cross-linking agents. The optimum amount of each cross-linking agent and the optimum conditions can be readily determined for any of the above copolymers.

What I claim and desire to protect by Letters Patent is:

1. A solid thermoplastic copolymer of vinyl 2-chloroethyl ether and a second ether selected from the group consisting of vinyl ethers of monoethylenically unsaturated alkanols and 1-alkoxybutadienes, wherein said vinyl 2-chloroethyl ether is present in an amount of from about 1 mole percent to about 99 mole percent.

2. The product of claim 1 wherein a second ether is a 1-alkoxybutadiene.

3. The product of claim 2 wherein the 1-alkoxybutadiene is 1-methoxybutadiene.

4. The product of claim 1 wherein a second ether is a vinyl ether of a monoethylenically unsaturated alkanol.

5. The product of claim 4 wherein the vinyl ether of a monoethylenically unsaturated alkanol is vinyl allyl ether.

6. The product of claim 1 wherein the vinyl 2-chloroethyl ether is present in an amount of at least 75 mole percent.

References Cited in the file of this patent

UNITED STATES PATENTS

| | | |
|---|---|---|
| 2,066,330 | Carothers | Jan. 5, 1937 |
| 2,189,529 | Carothers et al. | Feb. 6, 1940 |
| 2,265,640 | Garvey et al. | Dec. 9, 1941 |
| 2,626,252 | Tawney | Jan. 20, 1953 |